United States Patent
Arshad et al.

(10) Patent No.: US 11,602,736 B2
(45) Date of Patent: Mar. 14, 2023

(54) VANADIUM SCR CATALYSTS

(71) Applicant: JOHNSON MATTHEY PUBLIC LIMITED COMPANY, London (GB)

(72) Inventors: Zuharia Arshad, Royston (GB); Kaneshalingam Arulraj, Royston (GB); Guy Chandler, Royston (GB); Rainer Leppelt, Redwitz (DE); Andrew Newman, Royston (GB); Paul Phillips, Royston (GB); Oliver Rowe, Royston (GB); Christopher Smith, Royston (GB); Nicholas Spencer, Royston (GB); Isabel Tingay, Royston (GB); Rob Walker, Royston (GB); Oliver Hemming, Royston (GB); Agnes Raj, Reading (GB)

(73) Assignee: Johnson Matthey Public Limited Company, London (GB)

( * ) Notice: Subject to any disclaimer, the term of this patent is extended or adjusted under 35 U.S.C. 154(b) by 153 days.

(21) Appl. No.: 16/811,819

(22) Filed: Mar. 6, 2020

(65) Prior Publication Data
US 2020/0306734 A1 Oct. 1, 2020

Related U.S. Application Data

(60) Provisional application No. 62/968,499, filed on Jan. 31, 2020, provisional application No. 62/906,233, filed on Sep. 26, 2019, provisional application No. 62/815,701, filed on Mar. 8, 2019.

(51) Int. Cl.
| | | |
|---|---|---|
| *B01J 23/00* | (2006.01) | |
| *B01J 23/887* | (2006.01) | |
| *B01J 6/00* | (2006.01) | |
| *B01J 37/02* | (2006.01) | |
| *F01N 3/20* | (2006.01) | |
| *B01J 21/06* | (2006.01) | |

(52) U.S. Cl.
CPC ............ *B01J 23/8871* (2013.01); *B01J 6/001* (2013.01); *B01J 37/0215* (2013.01); *F01N 3/2066* (2013.01); *B01J 21/063* (2013.01)

(58) Field of Classification Search
None
See application file for complete search history.

(56) References Cited

U.S. PATENT DOCUMENTS

| | | | | |
|---|---|---|---|---|
| 4,782,039 | A * | 11/1988 | Lindsey ................. | B01J 23/10 502/304 |
| 2007/0142224 | A1* | 6/2007 | Akhtar ................... | C01G 23/07 502/309 |
| 2011/0150731 | A1* | 6/2011 | Schermanz ............ | B01J 21/063 423/239.1 |
| 2013/0040808 | A1* | 2/2013 | Schermanz .......... | B01J 23/8472 502/242 |
| 2015/0224486 | A1 | 8/2015 | Bauer et al. | |
| 2016/0236174 | A1* | 8/2016 | Lowry ................. | B01J 35/1052 |
| 2016/0288094 | A1* | 10/2016 | Malmberg ........... | B01J 35/1014 |
| 2016/0288112 | A1* | 10/2016 | Bauer ................... | F01N 3/2828 |
| 2017/0128883 | A1 | 5/2017 | Goffe | |
| 2019/0344247 | A1* | 11/2019 | Zhao ....................... | B01J 37/04 |

FOREIGN PATENT DOCUMENTS

| | | | |
|---|---|---|---|
| CN | 101513620 | * | 8/2009 |
| CN | 103736482 | * | 6/2015 |
| CN | 106732531 | * | 5/2017 |
| EP | 2883590 A1 | | 6/2015 |
| WO | 2016188989 | * | 12/2016 |
| WO | 2016188989 A1 | | 12/2016 |
| WO | 2020025604 A1 | | 2/2020 |

OTHER PUBLICATIONS

Casanova et al—"Mixed iron-erbium vanadate NH3-SCR catalysts", Catalysis Today, 2015 (241) pp. 159-168.

* cited by examiner

*Primary Examiner* — Sheng H Davis

(57) ABSTRACT

Methods and compositions related to a selective catalytic reduction catalyst comprising iron and vanadium, wherein the vanadium is present as (1) one or more vanadium oxides, and (2) metal vanadate of the form $Fe_xM_yVO_4$ where $x=0.2$ to $1$ and $y=1-x$, and where M comprises one or more non-Fe metals when $y>0$.

14 Claims, 9 Drawing Sheets

VANADIUM SCR CATALYSTS

BACKGROUND

Nitrogen oxides ($NO_x$) are usually produced when fuels are combusted, and are exhausted from moving sources such as a motor vehicle and fixed sources such as a power plant or an incinerator. These nitrogen compounds are identified as major causes of acid rain and smog formation. In light of stricter environmental protection regulations and increased emphasis on protecting the environment, more studies are being carried out with a focus on reducing nitrogen compounds through catalysts.

Selective catalytic reduction (SCR) devices that use active materials such as vanadium have been commonly used for removing nitrogen compounds that were emitted from fixed and mobile sources. Ammonia has been known as a suitable reduction agent for such a system.

However, vanadium catalysts are often prone to deactivation issues at higher temperatures, and are often limited to smaller active temperature window. This may be problematic, especially for mobile applications with varying exhaust temperatures. Therefore, a catalyst with higher performance in NOx conversion and which has improved thermal stability would provide immediate benefit.

SUMMARY OF THE INVENTION

According to some aspects of the present invention, a selective catalytic reduction catalyst comprises iron and vanadium, wherein the vanadium is present as (1) one or more vanadium oxides, and (2) metal vanadate of the form $Fe_xM_yVO_4$ where x=0.2 to 1 and y=1−x, and where M comprises one or more non-Fe metals when y>0.

According to some aspects of the present invention, a selective catalytic reduction catalyst comprises iron and vanadium, wherein the catalyst is prepared with a vanadium oxide precursor and metal vanadate of the form $Fe_xM_yVO_4$ where x=0.2 to 1 and y=1−x, and where M comprises one or more non-Fe metals when y>0.

According to some aspects of the present invention, a selective catalytic reduction catalyst comprises vanadium, iron, and titania, wherein the catalyst includes vanadium in an amount of up to about 7 wt %, expressed as $V_2O_5$ wt % of $V_2O_5+TiO_2$, including metal vanadate of the form $Fe_xM_yVO_4$ where x=0.2 to 1 and y=1−x, and where M comprises one or more non-Fe metals when y>0, wherein the metal vanadate is present in an amount of 20% to 75% of total amount of vanadium in the selective catalytic reduction catalyst.

In some aspects, the vanadium precursor comprises vanadyl oxalate, ammonium metavanadate, vanadyl oxysulfate, vanadium pentoxide, vanadyl acetylacetonate, vanadium(III) acetylacetonate, or combinations thereof. In some aspects, the vanadium precursor comprises vanadyl oxalate, ammonium metavanadate, or combinations thereof.

In some aspects, with regards to the metal vanadate, M may comprise Er, Al, Ce, or combinations thereof, when y>0. For example, the metal vanadate may comprise $FeVO_4$, $Fe_{0.5}Ce_{0.5}VO_4$, $Fe_{0.33}Al_{0.33}Er_{0.33}VO_4$, or combinations thereof. In some aspects, the metal vanadate may comprise $FeVO_4$.

In some aspects, the vanadium is present on a support comprising titania. In certain aspects, the titania is doped, for example, with W, Si, Mo, Nb, Sb, or combinations thereof.

In some aspects, the vanadium is present in an amount of about 2 wt % to about 7 wt %, expressed as $V_2O_5$ wt % of $V_2O_5+TiO_2$; about 3.5 wt % to about 7 wt %, expressed as $V_2O_5$ wt % of $V_2O_5+TiO_2$; or about 3.5 wt % to about 6.05 wt %, expressed as $V_2O_5$ wt % of $V_2O_5+TiO_2$.

In some aspects, the vanadium oxide precursor and metal vanadate are included in a weight ratio, expressed as a ratio of elemental vanadium, of about 4:1 to about 1:2. In some aspects, the catalyst is prepared with a vanadium oxide precursor and metal vanadate, where the vanadium oxide precursor and metal vanadate are included in a weight ratio, expressed as a ratio of elemental vanadium, of about 4:1 to about 1:2.

In some aspects, the catalyst comprises titania in an amount of about 60 wt % to about 93 wt % of the selective catalytic reduction catalyst. In some aspects, the titania comprises a blend of colloidal titania and a standard micro sized titania. The colloidal titania and standard micro sized titania may be present in a weight ratio of about 0.08 to about 0.4.

In some aspects, the catalyst further comprises tungsten. In some aspects, the catalyst further comprises antimony. In some aspects, the catalyst further comprises tungsten and antimony. The tungsten may be included in addition to any tungsten doped on titania. The antimony may be included in addition to any antimony doped on titania. In some aspects, the weight ratio of W:Ti in the catalyst is about 0.025 to about 0.2. In some aspects, the weight ratio of Sb:Ti in the catalyst is about 0.025 to about 0.2.

According to some aspects of the present invention, a washcoat for preparing a selective catalytic reduction catalyst comprises: (1) a vanadium oxide precursor, and (2) metal vanadate of the form $Fe_xM_yVO_4$ where x=0.2 to 1 and y=1−x, and where M comprises one or more non-Fe metals when y>0. The washcoat may further comprise titania, tungsten and/or antimony. In some aspects, tungsten and/or antimony are included in addition to any tungsten and/or antimony doped on titania.

According to some aspects of the present invention, a method of preparing a selective catalytic reduction catalyst comprising iron and vanadium, comprises preparing a washcoat comprising: (1) a vanadium oxide precursor, and (2) metal vanadate of the form $Fe_xM_yVO_4$ where x=0.2 to 1 and y=1−x, and where M comprises one or more non-Fe metals when y>0. The washcoat may further comprise titania, tungsten and/or titania. In some aspects, tungsten and/or antimony is included in addition to any tungsten and/or antimony doped on titania. The method may include applying the washcoat to a substrate and calcining, wherein the vanadium oxide precursor decomposes to one or more vanadium oxide. The method may include applying the washcoat to a substrate and calcining, wherein the calcined catalyst comprises one or more vanadium oxides and the metal vanadate.

DETAILED DESCRIPTION

Figure 1:
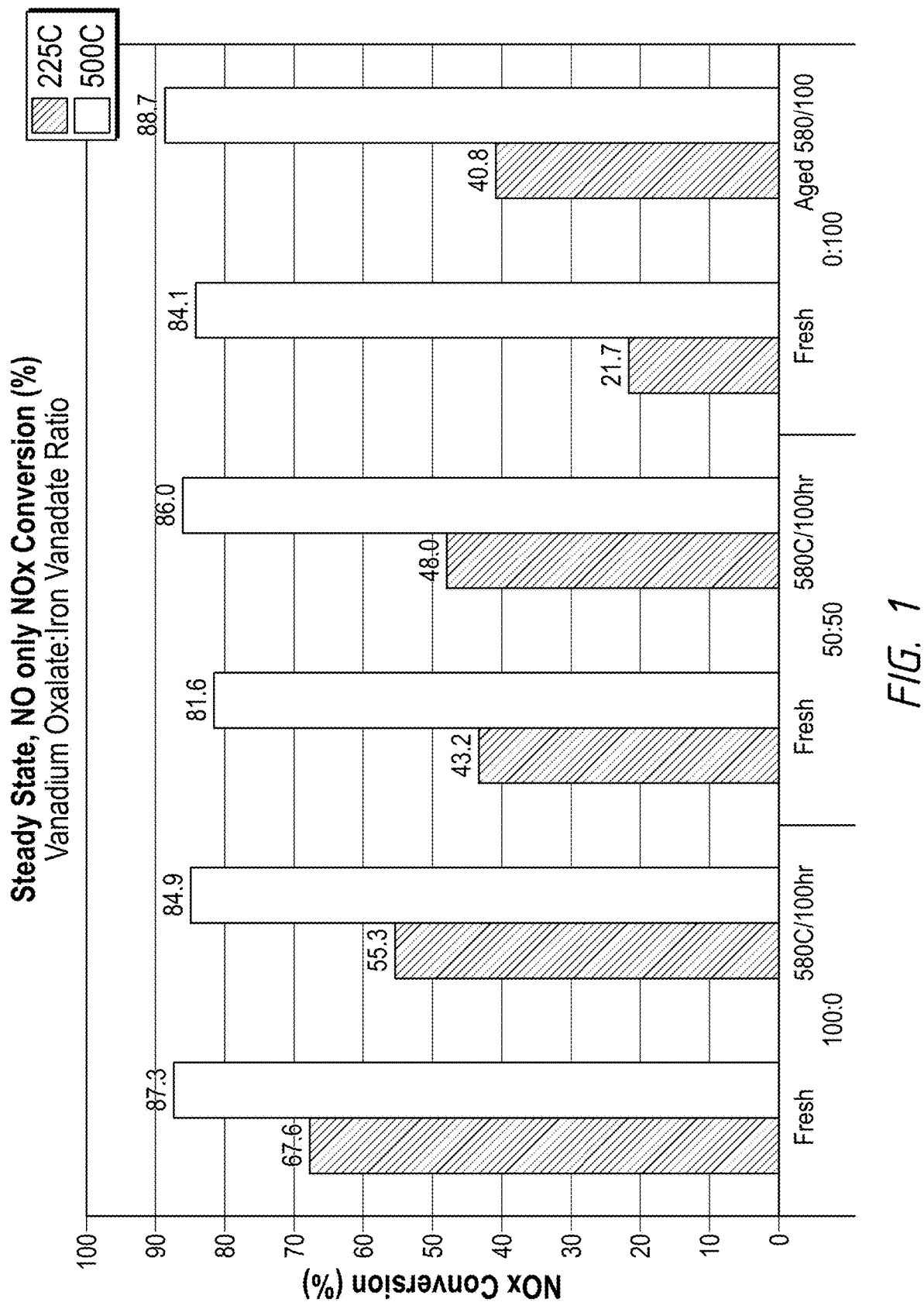
FIGS. 1-9 include data and images related to catalysts of the present invention and comparative formulations, as described in further detail herein.

Compositions and methods of the present invention relate to purification of exhaust gas from an internal combustion engine. The invention is particularly directed to cleaning of an exhaust gas from a diesel engine, especially engines in vehicles.

It has been found that vanadium selective catalytic reduction ("SCR") catalysts prepared according to formulations and methods of the present invention may provide surprising and unexpected benefits, including increased NOx conversion and higher thermal stability. Aspects of the invention will be described in further detail herein.

SCR/V-SCR

A selective catalytic reduction ("SCR") catalyst is a catalyst that reduces NOx to $N_2$ by reaction with nitrogen compounds (such as ammonia or urea) or hydrocarbons (lean NOx reduction). SCR catalysts may generally be comprised of a vanadium-titania catalyst, a vanadium-tungsta-titania catalyst, or a transition metal/molecular sieve catalyst.

SCR catalysts containing vanadium (vanadium SCR catalysts), may generally include vanadium on a support such as $TiO_2$ or may comprise hybrid catalysts including vanadium on a support such as $TiO_2$ with metal-zeolite or bare zeolite components blended in a formulation.

A vanadium SCR catalyst may include vanadium as free vanadium, vanadium ion, or an oxide of vanadium or a derivative thereof. In addition to vanadium, the catalyst can include other metal oxides such as oxides of tungsten, oxides of niobium, oxides of antimony, and/or oxides of molybdenum. As used herein, a "catalytically active" metal oxide is one that directly participates as a molecular component in the catalytic reduction of $NO_x$ and/or oxidization of $NH_3$ or other nitrogenous-based SCR reductants. By corollary, a "catalytically inactive" metal oxide is one which does not directly participate as a molecular component in the catalytic reduction of $NO_x$ and/or oxidization of $NH_3$ or other nitrogenous-based SCR reductants. In certain aspects, an oxide of vanadium is present in a majority amount (i.e., greater than 50 wt %) relative to other catalytically active metal oxides, such as tungsten oxides. In certain aspects, oxides of vanadium are present in a minority amount (i.e., less than 50 wt %) relative to other catalytically metal oxides, such as tungsten oxides.

In certain aspects, the support material for the vanadium component is titania or titania in combination with another component such as tungsten (VI) oxide, molybdenum oxide, niobium oxide, antimony oxide, or silica as a mixture or as a mixed oxide. The support material may be aluminosilicate, alumina, silica, and/or titania doped with silica. In some aspects, a support may be titania doped with W, Si, Mo, Nb, Sb, or combinations thereof. In some aspects, a support may be titania doped with W and Si. While both vanadium and the support can be metal oxides, the two components are structurally distinct from each other in that the support is present as discrete particles and the vanadium is present in a relatively thin layer or coating that adheres to the particles. Thus, the vanadium and titania are not present as a mixed oxide.

The mean particle size, based on the particle count, of the support material is preferably about 0.01-10 μm, for example about 0.5-5 μm, about 0.1-1 μm, or about 5-10 μm, and preferably has a majority of the particle count within one of these ranges. In some aspects, the support is a high surface area support.

In some aspects, the support is a molecular sieve. The molecular sieve may have an aluminosilicate framework (e.g. zeolite) or a silicoaluminophosphate framework (e.g. SAPO).

When the molecular sieve has an aluminosilicate framework (e.g. the molecular sieve is a zeolite), then typically the molecular sieve has a silica to alumina molar ratio (SAR) of from 5 to 200 (e.g. 10 to 200); 10 to 100 (e.g. 10 to 30 or 20 to 80); 10 to 50; 10 to 30; 12 to 40; 15 to 30; 5 to 20; 5 to 15; 8 to 15; 8 to 13; 10 to 15; 10 to 20; 10 to 40; 10 to 60; 10 to 80; 10 to 100; 10 to 150; <30; <20; <15; or <13. In some aspects, a suitable molecular sieve has a SAR of >200; >600; or >1200. In some aspects, the molecular sieve has a SAR of from about 1500 to about 2100.

Typically, the molecular sieve is microporous. A microporous molecular sieve has pores with a diameter of less than 2 nm (e.g. in accordance with the IUPAC definition of "microporous" [see *Pure & Appl. Chem.*, 66(8), (1994), 1739-1758)]).

The molecular sieve may be a small pore molecular sieve (e.g. a molecular sieve having a maximum ring size of eight tetrahedral atoms), a medium pore molecular sieve (e.g. a molecular sieve having a maximum ring size of ten tetrahedral atoms) or a large pore molecular sieve (e.g. a molecular sieve having a maximum ring size of twelve tetrahedral atoms) or a combination of two or more thereof.

In some aspects, the molecular sieve may be mesoporous. A mesoporous molecular sieve has pores with a diameter between 2 and 50 nm (e.g. in accordance with the IUPAC definition of "microporous").

When the molecular sieve is a small pore molecular sieve, then the small pore molecular sieve may have a framework structure represented by a Framework Type Code (FTC) selected from the group consisting of ACO, AEI, AEN, AFN, AFT, AFX, ANA, APC, APD, ATT, CDO, CHA, DDR, DFT, EAB, EDI, EPI, ERI, GIS, GOO, IHW, ITE, ITW, LEV, LTA, KFI, MER, MON, NSI, OWE, PAU, PHI, RHO, RTH, SAT, SAV, SFW, SIV, THO, TSC, UEI, UFI, VNI, YUG and ZON, or a mixture and/or combination and/or an intergrowth of two or more thereof. In some aspects, the small pore molecular sieve has a framework structure selected from the group consisting of CHA, LEV, AEI, AFX, ERI, LTA, SFW, KFI, DDR and ITE. In some aspects, the small pore molecular sieve has a framework structure selected from the group consisting of CHA, AEI, and AFX. In some aspects, the small pore molecular sieve has a framework structure selected from the group consisting of CHA and AEI. The small pore molecular sieve may have a CHA framework structure. The small pore molecular sieve may have an AEI framework structure.

When the molecular sieve is a medium pore molecular sieve, then the medium pore molecular sieve may have a framework structure represented by a Framework Type Code (FTC) selected from the group consisting of AEL, AFO, AHT, BOF, BOZ, CGF, CGS, CHI, DAC, EUO, FER, HEU, IMF, ITH, ITR, JRY, JSR, JST, LAU, LOV, MEL, MFI, MFS, MRE, MTT, MW, MWW, NAB, NAT, NES, OBW, PAR, PCR, PON, PUN, RRO, RSN, SFF, SFG, STF, STI, STT, STW, SVR, SZR, TER, TON, TUN, UOS, VSV, WEI and WEN, or a mixture and/or an intergrowth of two or more thereof. In some aspects, the medium pore molecular sieve has a framework structure selected from the group consisting of FER, MEL, MFI, and STT. In some aspects, the medium pore molecular sieve has a framework structure selected from the group consisting of FER and MFI, particularly MFI. When the medium pore molecular sieve is a zeolite and has an FER or MFI framework, then the zeolite may be ferrierite, silicalite or ZSM-5.

When the molecular sieve is a large pore molecular sieve, then the large pore molecular sieve may have a framework structure represented by a Framework Type Code (FTC) selected from the group consisting of AFI, AFR, AFS, AFY, ASV, ATO, ATS, BEA, BEC, BOG, BPH, BSV, CAN, CON, CZP, DFO, EMT, EON, EZT, FAU, GME, GON, IFR, ISV, ITG, IWR, IWS, IWV, IWW, JSR, LTF, LTL, MAZ, MEI, MOR, MOZ, MSE, MTW, NPO, OFF, OKO, OSI, RON, RWY, SAF, SAO, SBE, SBS, SBT, SEW, SFE, SFO, SFS, SFV, SOF, SOS, STO, SSF, SSY, USI, UWY, and VET, or a mixture and/or an intergrowth of two or more thereof. In some aspects, the large pore molecular sieve has a framework structure selected from the group consisting of AFI, BEA, MAZ, MOR, and OFF. In some aspects, the large pore molecular sieve has a framework structure selected from the group consisting of BEA, MOR and FAU. When the large pore molecular sieve is a zeolite and has a BEA, FAU or MOR framework, then the zeolite may be a beta zeolite, faujasite, zeolite Y, zeolite X or mordenite.

In some aspects, a suitable molecular sieve includes a combination of small and large pore frameworks. In some aspects, a suitable molecular sieve includes ZSM-34 (ERI+ OFF).

A transition metal/molecular sieve catalyst comprises a transition metal and a molecular sieve, such as an aluminosilicate zeolite or a silicoaluminophosphate. The transition metal may be selected from chromium, cerium, manganese, iron, cobalt, nickel, and copper, and mixtures thereof. Iron and copper may be particularly preferred. An SCR catalyst may include a metal/zeolite catalyst such as, for example, iron/beta zeolite, copper/beta zeolite, copper/SSZ-13, copper/SAPO-34, Fe/ZSM-5, or copper/ZSM-5. In some aspects, the molecular sieve may comprise a beta zeolite, a ferrierite, or a chabazite. Preferred SCR catalysts include Fe-CHA, Fe-AEI, Mn-CHA, Mn-BEA, Mn-FER, Mn-MFI, Cu-CHA, such as Cu-SSZ-13, and Fe-Beta zeolite.

A selective catalytic reduction catalyst may be used with a filter, referred to as an SCRF. Selective catalytic reduction filters (SCRF) are single-substrate devices that combine the functionality of an SCR and a particulate filter. They may be used to reduce $NO_x$ as well as particulate emissions from internal combustion engines. In addition to the SCR catalyst coating, the particulate filter may also include other metal and metal oxide components (such as Pt, Pd, Fe, Mn, Cu, and ceria) to oxidize hydrocarbons and carbon monoxide in addition to destroying soot trapped by the filter. Systems of the present invention may include SCRF catalysts comprising a vanadium catalyst, referred to herein as a vanadium SCRF catalyst. References to use of the vanadium SCR catalyst throughout this application are understood to include use of the vanadium SCRF catalyst as well, where applicable.

Any suitable washcoat preparation methods may be used for the catalysts of the present invention, such as, for example, one-pot preparation. Catalysts may typically be prepared as an aqueous slurry of components, which may comprise a mixture of soluble and insoluble components, and in some aspects, may have a final slurry pH of 5-8. The slurry may be deposited on a catalyst monolith by a washcoating process such as an immersion or vacuum process from one or both ends of the monolith, typically followed by drying and calcination. Unless specified otherwise, examples discussed below were dried at 100° C. for approximately 15 minutes, and subsequently calcined at 500° C. for approximately 10 minutes.

Vanadium Oxide Precursor/$Fe_xM_2VO_4$

Vanadium SCR catalysts are typically prepared with a vanadium oxide precursor such as a single vanadium salt like vanadyl oxalate ($C_2O_5V$). A vanadium oxide precursor such as vanadyl oxalate provides benefits such as strong fresh NOx conversion at low temperature, but was found to deactivate upon aging due to the vanadium sintering. Higher vanadium loadings lead to stronger fresh activity at low temperature, but a greater magnitude of deactivation.

Metal vanadates in the $Fe_xM_yVO_4$ family (referred to herein as $Fe_xM_yVO_4$) are a family of iron-vanadium materials where x=0.2 to 1 and y=1−x, and where M can be made up of one or more non-Fe metals including but not limited to Er, Al, Ce, for example $FeVO_4$, $Fe_{0.5}Ce_{0.5}VO_4$, and $Fe_{0.33}Al_{0.33}Er_{0.33}VO_4$. It was discovered that $Fe_xM_yVO_4$ have a very low fresh NOx conversion activity, but activate significantly upon aging or high temperature exposure, such as about 650° C. for 2 hours. By preparing a catalyst with a blend of (1) one or more vanadium oxide precursor that will decompose into one or more vanadium oxide upon calcination, and (2) $Fe_xM_yVO_4$ within a certain range of ratios, such a catalyst can achieve an unexpected level of catalyst stability with aging, with minimal fresh to aged delta in low temperature NO-SCR activity (such as about 175° C. to about 300° C.).

Also surprisingly, a catalyst prepared with both a vanadium oxide precursor and $Fe_xM_yVO_4$ enables a higher total vanadium loading, thereby resulting in a highly performing and highly thermally durable catalyst. A higher vanadium loading also increases resistance to site specific poisons which may deposit on the SCR catalyst during operation, by increasing the total number of vanadium sites in the catalyst.

As used herein, a vanadium oxide precursor is understood to refer to a vanadium composition that may decompose into one or more vanadium oxides upon calcination. Examples of suitable vanadium oxide precursors may include vanadyl oxalate, ammonium metavanadate, vanadyl oxysulfate, vanadium pentoxide, vanadyl acetylacetonate, vanadium (III) acetylacetonate, or combinations thereof. In some aspects, suitable vanadium oxide precursors include vanadyl oxalate and ammonium metavanadate.

A selective catalytic reduction catalyst as described herein may be prepared with a vanadium oxide precursor and $Fe_xM_yVO_4$. Upon calcination, the vanadium oxide precursor may decompose to one or more vanadium oxides. Therefore, a selective catalytic reduction catalyst as described herein may include iron and vanadium, wherein the vanadium is present as (1) one or more vanadium oxide, and (2) $Fe_xM_yVO_4$. In some aspects, a selective catalytic reduction catalyst as described herein may include (1) vanadium on a support comprising titania, and (2) iron.

Ratios

A vanadium oxide precursor such as vanadyl oxalate and metal vanadates in the $Fe_xM_yVO_4$ family such as $FeVO_4$ may be combined to provide a catalyst that is highly stable with minimal deactivation after typical vanadium SCR aging, such as, for example, aging at about 580° C. for about 100 hours, compared to a catalyst made using only vanadyl oxalate. A catalyst may include a vanadium oxide precursor such as vanadyl oxalate and metal vanadates in the $Fe_xM_yVO_4$ family such as $FeVO_4$ in a weight ratio, expressed in elemental vanadium ratios, of about 6:1 to about 1:2; about 5:1 to about 1:2; about 4:1 to about 1:2; about 3:1 to about 1:2; about 3:1 to about 1:1; about 6:1; about 5:1; about 4:1; about 3:1; about 2:1; about 1:1; about 1:2 or about 1:3.

Vanadium Loading

Because a combination of a vanadium oxide precursor and $Fe_xM_yVO_4$ may provide a more stable catalyst, it was found that, as a result, the total vanadium loading in the catalyst is able to be increased without compromising aged performance. Although vanadium on a titania support is an active catalyst, the vanadium oxides on the surface are known to promote the sintering and surface area loss of the titania support, which may reduce the aged activity. Typically, when using a vanadium oxide precursor-only source and a typical 500° C. calcination, a significant fresh to aged delta can be present at any vanadium loading. In particular, a vanadium loading (expressed as $V_2O_5$ wt % of $V_2O_5$+$TiO_2$) above about 4 wt % may result in loss of light-off performance on aging, such as 580° C./100 hr aging, whereas with a combination of a vanadium precursor and $Fe_xM_yVO_4$, vanadium loadings (expressed as $V_2O_5$ wt % of $V_2O_5$+$TiO_2$) in the range of about 2 wt % to about 6.5 wt % can be achieved with minimal deactivation in light-off performance on aging. Without wishing to be bound to this theory, it is thought both that the $Fe_xM_yVO_4$ vanadium source is less damaging to the titania support, and that the activation of $Fe_xM_yVO_4$ on aging compensates for the deactivation of vanadium oxides. A catalyst may include vanadium in an amount, expressed as $V_2O_5$ wt % of $V_2O_5$+$TiO_2$, of up to about 2 wt %; up to about 3 wt %; up to about 3.5 wt %; up to about 4 wt %; up to about 4.5 wt %; up to about 5 wt %; up to about 5.5 wt %; up to about 6 wt %; up to about 6.5 wt %; up to about 7 wt %; up to about 7.5 wt %; up to about 8 wt %; about 1 wt % to about 8 wt %; about 1 wt % to about 7.5 wt %; about 1 wt % to about 7 wt %; about 1 wt % to about 6.5 wt %; about 1 wt % to about 6 wt %; about 1 wt % to about 5.5 wt %; about 2 wt % to about 7.5 wt %; about 2 wt % to about 7 wt %; about 3 wt % to about 7.5 wt %; about 3.5 wt % to about 7.5 wt %; about 3.5 wt % to about 7 wt %; about 3.7 wt % to about 6.5 wt %; about 3.7 wt % to about 6.05 wt %; about 1 wt % to about 5 wt %; about 2 wt % to about 4.5 wt %; about 1 wt % to about 4 wt %; about 2.5 wt % to about 4.5 wt %; about 2 wt % to about 4 wt %; or about 3 wt % to about 4 wt %. As used throughout this specification, it is understood that in the calculation of total vanadium loadings expressed as "$V_2O_5$ wt % of $V_2O_5$+$TiO_2$," $TiO_2$ refers to a content of $TiO_2$, not a loading of doped $TiO_2$ in the formulation. For example, a washcoat containing a 10% doped titania at 80 wt % of the total washcoat, with no other titania components, would be 72% $TiO_2$, and if the washcoat contained vanadium (as $V_2O_5$) at 3 wt % of the total washcoat, it would be expressed as having (3/[72+3])=4 wt % $V_2O_5$ of $V_2O_5$+$TiO_2$.

In some aspects, a catalyst may include $Fe_xM_yVO_4$ in an amount (expressed as % of the total amount of vanadium in the catalyst) of about 20% to about 75%; about 20% to about 67%; about 25% to about 67%; about 33% to about 50%; about 20%; about 25%; about 33%; about 50%; about 67%; or about 75%, of the total amount of vanadium in the catalyst.

Thermal Durability

For automotive SCR applications, an OEM must calibrate the reductant dosing strategy to ensure that the relevant NOx legislation is met both in the fresh state and at end of life of the catalyst. Where the performance of the catalyst is known to deteriorate over time in the application, a deterioration factor (DF) for the SCR performance typically needs to be established and incorporated into the engine calibration, and accurately establishing this DF can be a challenge for the OEMs. Therefore, a catalyst with a low fresh to aged delta for thermal aging is desirable in order to simplify the calibration for the OEM. For example, an NO-only SCR performance at low temperature with less than a 10% reduction between fresh and aged, or less than a 15% increase between fresh and aged, would be desired.

In certain circumstances, higher temperature calcination may be used to reduce the fresh performance and thus the fresh to aged delta, however the use of higher temperatures is undesirable from a cost and sustainability perspective, and a compositional method of reducing the fresh to aged delta is preferred.

A catalyst as described herein may exhibit high thermal stability, demonstrated by minimal deactivation after typical vanadium SCR catalyst aging. For example, a catalyst prepared with a vanadium oxide precursor and $Fe_xM_yVO_4$ may demonstrate thermal durability after aging at about 550° C. to about 650° C. for about 50 to about 200 hours, for example about 580° C. for 100 hours, and/or about 600° C. for about 50 hours.

A catalyst prepared with a vanadium precursor and $Fe_xM_yVO_4$ as described herein may advantageously provide a high level of catalyst stability to aging, demonstrated by the minimal fresh to aged delta at low temperature (150° C. to 300° C.). In a particular example, after thermal aging at 580° C. for 100 hr, a catalyst prepared with a vanadium precursor and $Fe_xM_yVO_4$ may provide NOx conversion performance at 225° C. with conditions of 60K SV, ANR 1.05, and 500 ppm NOX of 73% fresh, 75% aged, (an increase of 2%), whereas an example reference catalyst prepared with a vanadium precursor only may provide NOx conversion under the same conditions of 79% fresh, 64% aged (a decrease of 15%). A catalyst prepared with a vanadium precursor and $Fe_xM_yVO_4$ may demonstrate a fresh to aged delta (expressed in terms of percent increase or decrease) of NOx conversion at low temperature (150° C. to 300° C.) of a decrease of less than 13%; less than 12%; less than 10%; less than 8%; less than 6%; less than 4%; less than 2%; less than 1%; 0% to 13%; 0% to 10%; 0% to 8%; 0% to 6%; 0% to 4%; 0% to 2%; an increase of less than 0%; less than 1%; less than 2%; less than 4%; less than 5%; less than 6%; less than 8%; less than 10%; less than 15%; 0% to 1%; 0% to 2%; 0% to 4%; 0% to 6%; 0% to 8%; 0% to 10%; or 0% to 15%.

Titania Binder

Vanadium SCR catalysts may traditionally be prepared with certain amounts of vanadium, tungsten as a promoter or dopant, and titania support. These components may be coated onto a monolith and adhered using a binder, which may be any one or more of a number of colloidal oxides. The binder is generally considered to be inert, as it takes no part in catalysis and serves only to fix the catalyst to the monolith.

It has been discovered that using a colloidal anatase titania as a binder, however, may provide additional catalyst performance benefits. It is believed that these benefits arise because the action of calcining the catalyst results in the sintering of the colloidal anatase particles, forming an active support material on which vanadium may partake in the SCR reaction. It was further discovered that by incorporating enough vanadium to optimally coat this newly formed surface, and enough tungsten to support the titania and promote the SCR reaction, the binder can be used not only to adhere the catalyst material, but to act as an active catalyst as well.

Colloidal/Standard Titania Blend Support

It has also been found that preparing a catalyst using a blend of colloidal titania with standard micro sized titania may result in a catalyst with an increased active SCR temperature, as compared to a catalyst prepared with colloidal silica and standard micro sized titania. It is believed that the small particle size of the colloidal titania particles allow it to sinter and join the larger support particles together, adhering the standard micro sized titania together and to the support, and creating a larger support surface, when incorporated into a washcoat as a blend with a standard micro sized titania. By including a carefully optimized amount of tungsten in the formulation, the tungsten may be incorporated into the colloidal titania binder as it sinters, creating an active and promoted support. It was found that the mixture of colloidal titania and calcined anatase titania may provide a high titania surface area with sufficient stability to prevent a large aging effect. Further, the binding function of the colloidal titania may allow a lower amount of inert binder (such as $SiO_2$) to be used without compromising adhesion of the washcoat, increasing the weight percent of titania in the total washcoat compared to a catalyst prepared with a blend of colloidal silica and standard micro sized titania. Such an arrangement allows a higher total washcoat vanadium content to be stabilized without increasing the $V_2O_5$ wt % of $V_2O_5+TiO_2$, resulting in a catalyst with an increased active SCR temperature window.

A catalyst including a blend of colloidal titania with standard micro sized titania may include titania in a weight percent of the catalyst of about 60% to about 93%; about 60 wt % to about 90 wt %; about 65 wt % to about 90 wt %; about 70 wt % to about 90 wt %; about 75 wt % to about 85 wt %; about 77 wt % to about 82 wt %; about 79 wt % to about 81 wt %; about 60 wt %; about 62 wt %; about 65 wt %; about 67 wt %; about 70 wt %; about 72 wt %; about 75 wt %; about 77 wt %; about 80 wt %; about 82 wt %; about 85 wt %; about 87 wt %; about 90 wt %; about 93%; greater than 60 wt %; greater than 62 wt %; greater than 65 wt %; greater than 67 wt %; greater than 70 wt %; greater than 72 wt %; greater than 75 wt %; greater than 77 wt %; greater than 80 wt %; greater than 82 wt %; greater than 85 wt %; greater than 87 wt %; or greater than 90%.

A catalyst including a blend of colloidal titania with standard micro sized titania may include an increased weight percent of titania compared to a catalyst prepared with a blend of colloidal silica and standard micro sized titania, which may in turn correspond with a higher total vanadium loading. A catalyst including a blend of colloidal titania with standard micro sized titania may include a weight percent of titania which is an increase of about 7% to about 30%; about 10% to about 30%; about 5% to about 25%; about 7% to about 23%; about 10% to about 20%; about 10% to about 15%; about 15% to about 20%; about 12% to about 18%; about 15% to about 30%; about 20% to about 30%; about 25% to about 30%; about 7% to about 10%; about 7% to about 15%; about 7% to about 20%; about 7% to about 25%; about 10% to about 25%; about 15% to about 20%; about 7%; about 10%; about 15%; about 20%; about 25%; or about 30%, compared to a weight percent of titania in a catalyst prepared with a blend of colloidal silica and standard micro sized titania. Likewise, a catalyst including a blend of colloidal titania with standard micro sized titania may include a weight percent of vanadium which in an increase of about 7% to about 30%; about 10% to about 30%; about 5% to about 25%; about 7% to about 23%; about 10% to about 20%; about 10% to about 15%; about 15% to about 20%; about 12% to about 18%; about 15% to about 30%; about 20% to about 30%; about 25% to about 30%; about 7% to about 10%; about 7% to about 15%; about 7% to about 20%; about 7% to about 25%; about 10% to about 25%; about 15% to about 20%; about 7%; about 10%; about 15%; about 20%; about 25%; or about 30%, compared to a weight percent of vanadium in a catalyst prepared with a blend of colloidal silica and standard micro sized titania.

A catalyst may be formulated with a blend of colloidal titania and a standard micro sized titania within a range of weight ratios to provide a thermally stable catalyst. For example, a catalyst may include colloidal titania and standard micro sized titania in a weight ratio of titania from colloid to standard micro sized titania (excluding dopants) of about 0.025 to about 0.4; about 0.05 to about 0.4; about 0.06 to about 0.4; about 0.07 to about 0.4; about 0.08 to about 0.35; about 0.09 to about 0.3; about 0.1 to about 0.25; about 0.11 to about 0.25; about 0.12 to about 0.24; about 0.1 to about 0.4; about 0.12 to about 0.4; about 0.15 to about 0.4; about 0.17 to about 0.37; about 0.18 to about 0.35; about 0.18 to about 0.33; about 0.18 to about 0.3; about 0.18 to about 0.28; about 0.2 to about 0.26; about 0.22 to about 0.24; about 0.1; about 0.12; about 0.15; about 0.17; about 0.18; about 0.2; about 0.22; about 0.23; about 0.24; about 0.25; about 0.26; about 0.28; about 0.3; about 0.33; about 0.35; about 0.37; or about 0.4. Such weight ratios refer to the micro sized titania including any dopants.

A catalyst formulated with a blend of colloidal titania and a standard micro sized titania may provide a low delta in SCR performance between fresh and aged conditions, thereby providing a stable catalyst. This low delta is understood to represent high thermal stability, demonstrated by minimal deactivation after typical vanadium SCR catalyst aging. In some aspects, a low delta is understood to mean <10% difference in absolute NOx conversion between a fresh catalyst and a catalyst aged at 580° C. for 100 hours.

Tungsten

In order to activate the colloidal titania as an effective support material, tungsten may be included in a catalyst formulation. A typical titania support material may contain about 3 wt % to about 10 wt % $WO_3$ and up to about 10 wt % $SiO_2$, with a W:Ti weight ratio of about 0.015 to about 0.06; or more optimally, about 3 wt % to about 7 wt % $WO_3$ and up to about 5 wt % $SiO_2$ with a W:Ti weight ratio of about 0.015 to about 0.056. A typical titania support material may be doped with tungsten in a range of about 1 to about 15%. However, it has been found that adding extra tungsten into the washcoat to maintain the total W:Ti weight ratio in the catalyst in the range of about 0.025 to about 0.2; about 0.025 to about 0.09; about 0.035 to about 0.09; or about 0.035 to about 0.06, may provide a more active and stable catalyst. The tungsten may be added as a component to the washcoat, separately from tungsten that is doped on titania. In some aspects, a selective catalytic reduction catalyst of the present invention may include additional tungsten in an amount of up to about 5 wt % $WO_3$ in the catalyst. In some aspects, a selective catalytic reduction catalyst of the present invention may include about 1 to about 15 wt % $WO_3$ in the catalyst.

Antimony

In some aspects, the catalyst further comprises antimony. In some aspects, the catalyst further comprises tungsten and antimony. In some aspects, the antimony may be included in addition to any antimony doped on titania. In some aspects, the weight ratio of Sb:Ti in the catalyst is about 0.025 to about 0.2; about 0.025 to about 0.09; about 0.035 to about 0.09; or about 0.035 to about 0.06.

Antimony may be added to a washcoat, separately from antimony that is dope on titania. The washcoat may comprise titania, tungsten and/or antimony.

Other Components

Substrate

A catalyst article of the present invention may include a substrate and a vanadium SCR catalyst. The substrate may be a flow-through substrate or a filtering substrate. The substrate may comprise the vanadium SCR catalyst (i.e. the catalyst article is obtained by extrusion) or the vanadium SCR catalyst may be disposed or supported on the substrate (i.e. the vanadium SCR catalyst is applied onto the substrate by a washcoating method). The vanadium SCR catalyst may coat the substrate entirely or partially, as desired. In some embodiments, a catalyst article includes a vanadium SCR catalyst extruded article which is coated with one or more additional catalysts. In some embodiments, the extruded catalyst is coated with one or more additional SCR catalysts, which could include, for example, a vanadium SCR catalyst.

In some aspects, the catalyst article may comprises the vanadium SCR catalyst in a total concentration of about 1 to about 8.5 g in$^{-3}$; about 2 to about 7.5 g in$^{-3}$; about 3 to about 6.5 g in$^{-3}$; about 4 to about 5.5 g in$^{-3}$; about 0.5 to about 4.0 g in$^{-3}$; about 1.0 to about 3.0 g in$^{-3}$; or about 1.2 to about 2.5 g/in$^3$.

When the catalyst article has a filtering substrate, then it is a selective catalytic reduction filter catalyst. The selective catalytic reduction filter comprises a filtering substrate and the vanadium SCR catalyst. References to use of SCR catalysts throughout this application are understood to include use of selective catalytic reduction filter catalysts as well, where applicable.

The flow-through or filter substrate is a substrate that is capable of containing catalyst/adsorber components. The substrate is preferably a ceramic substrate or a metallic substrate. The ceramic substrate may include any suitable refractory material, e.g., alumina, silica, titania, ceria, zirconia, magnesia, zeolites, silicon nitride, silicon carbide, zirconium silicates, magnesium silicates, aluminosilicates, metallo aluminosilicates (such as cordierite and spudomene), or a mixture or mixed oxide of any two or more thereof. Cordierite, a magnesium aluminosilicate, and silicon carbide are particularly preferred.

The metallic substrates may be made of any suitable metal, and in particular heat-resistant metals and metal alloys such as titanium and stainless steel as well as ferritic alloys containing iron, nickel, chromium, and/or aluminum in addition to other trace metals.

The flow-through substrate is preferably a flow-through monolith having a honeycomb structure with many small, parallel thin-walled channels running axially through the substrate and extending throughout from an inlet or an outlet of the substrate. The channel cross-section of the substrate may be any shape, but is preferably square, sinusoidal, triangular, rectangular, hexagonal, trapezoidal, circular, or oval. The flow-through substrate may also be high porosity which allows the catalyst to penetrate into the substrate walls.

The filter substrate is preferably a wall-flow monolith filter. The channels of a wall-flow filter are alternately blocked, which allow the exhaust gas stream to enter a channel from the inlet, then flow through the channel walls, and exit the filter from a different channel leading to the outlet. Particulates in the exhaust gas stream are thus trapped in the filter.

The catalyst composition may be added to the flow-through or filter substrate by any known means, such as a washcoat procedure.

When the catalyst article is selective catalytic reduction filter, then the filtering substrate may preferably be a wall flow filter substrate monolith. The wall flow filter substrate monolith (e.g. of the SCR-DPF) typically has a cell density of 60 to 400 cells per square inch (cpsi). It is preferred that the wall flow filter substrate monolith has a cell density of 100 to 350 cpsi, more preferably 200 to 300 cpsi.

The wall flow filter substrate monolith may have a wall thickness (e.g. average internal wall thickness) of 0.20 to 0.50 mm, preferably 0.25 to 0.35 mm (e.g. about 0.30 mm).

Generally, the uncoated wall flow filter substrate monolith has a porosity of from 50 to 80%, preferably 55 to 75%, and more preferably 60 to 70%.

The uncoated wall flow filter substrate monolith typically has a mean pore size of at least 5 µm. It is preferred that the mean pore size is from 10 to 40 µm, such as 15 to 35 µm, more preferably 20 to 30 µm.

The wall flow filter substrate may have a symmetric cell design or an asymmetric cell design.

In general for a selective catalytic reduction filter, the catalyst composition is disposed within the wall of the wall-flow filter substrate monolith. Additionally, the catalyst composition may be disposed on the walls of the inlet channels and/or on the walls of the outlet channels.

Catalyst compositions of embodiments of the present invention may be coated on a suitable monolith substrate. Washcoat compositions containing the catalyst compositions of the present invention for coating onto the monolith substrate or for manufacturing extruded type substrate monoliths can comprise a binder selected from the group consisting of alumina, silica, (non zeolite) silica-alumina, naturally occurring clays, $TiO_2$, $ZrO_2$, and $SnO_2$. In general, catalytic articles comprising the catalyst composition in a desired loading level may be prepared by washcoating, extrusion, or other methods known in the art.

Methods and Systems

Methods of the present invention relate to treating exhaust gas containing nitrogen oxides, by contacting the exhaust gas with a reductant, such as a nitrogenous reductant or hydrocarbon reductant, in the presence of a catalyst composition as described herein. In this way, vanadium SCR catalysts of the present invention may function as selective catalytic reduction catalysts.

In some embodiments, the nitrogen oxides are reduced with the reducing agent at a temperature of at least 100° C. In another embodiment, the catalyst described herein are effective at reducing nitrogen oxides are reduced with the reducing agent over a wide temperature range (e.g., from about 150° C. to 750° C.) in addition to being hydrothermally stable at temperatures above 900° C. The latter embodiments may be particularly useful for treating exhaust gases from heavy and light duty diesel engines, particularly engines comprising exhaust systems comprising (optionally catalyzed) diesel particulate filters which are regenerated actively, e.g. by injecting hydrocarbon into the exhaust system upstream of the filter, wherein the zeolite catalyst for use in the present invention is located downstream of the filter.

In a particular aspect, the temperature range is from 175 to 550° C. In another embodiment, the temperature range is from 175 to 400° C. In some aspects, the temperature range is from 275 to 500° C., or 250 to 550° C. When $N_2O$ is present in the gas stream, the temperature range may be wider, such as 150 to 650° C.; 175 to 625° C.; 200 to 600° C.; or 225 to 575° C.

In some embodiments, the nitrogen oxides reduction is carried out in the presence of oxygen. In some embodiments, the nitrogen oxides reduction is carried out in the absence of oxygen.

The nitrogenous reductant can be ammonia per se or the source of nitrogenous reductant can be hydrazine or any suitable ammonia precursor, such as urea ($(NH_2)_2CO$), ammonium carbonate, ammonium carbamate, ammonium hydrogen carbonate or ammonium formate. The reductant can be injected into the exhaust gas stream from an external source, such as reservoir or tank, supplied in-situ by a Nitrogen Storage Catalyst or NOx Adsorber Catalyst, or a combination of both. The reductant should be introduced into the exhaust gas upstream of the vanadium SCR catalyst.

The method can be performed on a gas derived from a combustion process, such as from an internal combustion engine (whether mobile or stationary), a gas turbine and coal or oil-fired power plants. The method may also be used to treat gas from industrial processes such as refining, from refinery heaters and boilers, furnaces, the chemical processing industry, coke ovens, municipal waste plants and incinerators, coffee roasting plants etc.

In a particular aspect, the method is used for treating exhaust gas from a vehicular lean burn internal combustion engine, such as a diesel engine, a lean-burn gasoline engine or an engine powered by liquid petroleum gas or natural gas.

In some aspects, the invention provides an exhaust system for a vehicular lean burn internal combustion engine, which system comprising a conduit for carrying a flowing exhaust gas, a source of nitrogenous reductant, a vanadium SCR catalyst disposed in a flow path of the exhaust gas, and means for metering nitrogenous reductant into a flowing exhaust gas upstream of the vanadium SCR catalyst.

A system can include means, when in use, for controlling the metering means so that nitrogenous reductant is metered into the flowing exhaust gas only when it is determined that the catalyst composition is capable of catalyzing $NO_x$ reduction at or above a desired efficiency, such as at above 100° C., above 150° C., or above 175° C. The determination by the control means can be assisted by one or more suitable sensor inputs indicative of a condition of the engine selected from the group consisting of: exhaust gas temperature, catalyst bed temperature, accelerator position, mass flow of exhaust gas in the system, manifold vacuum, ignition timing, engine speed, lambda value of the exhaust gas, the quantity of fuel injected in the engine, the position of the exhaust gas recirculation (EGR) valve and thereby the amount of EGR and boost pressure.

In some aspects, metering is controlled in response to the quantity of nitrogen oxides in the exhaust gas determined either directly (using a suitable $NO_x$ sensor) or indirectly, such as using pre-correlated look-up tables or maps—stored in the control means—correlating any one or more of the abovementioned inputs indicative of a condition of the engine with predicted $NO_x$ content of the exhaust gas.

The control means may comprise a pre-programmed processor such as an electronic control unit (ECU).

The metering of the nitrogenous reductant may be arranged such that 60% to 200% of theoretical ammonia is present in exhaust gas entering the SCR catalyst calculated at 1:1 $NH_3/NO$ and 4:3 $NH_3/NO_2$.

In some aspects, an oxidation catalyst for oxidizing nitrogen monoxide in the exhaust gas to nitrogen dioxide can be located upstream of a point of metering the nitrogenous reductant into the exhaust gas. In some embodiments, the oxidation catalyst is adapted to yield a gas stream entering the SCR catalyst composition having a ratio of NO to $NO_2$ of from about 4:1 to about 1:3 by volume, e.g. at an exhaust gas temperature at oxidation catalyst inlet of 200° C. to 450° C.; or 250° C. to 450° C. This concept is disclosed in S. Kasaoka et al. "Effect of Inlet $NO/NO_2$ Molar Ratio and Contribution of Oxygen in the Catalytic Reduction of Nitrogen Oxides with Ammonia", Nippon Kagaku Kaishi, 1978, No. 6, pp. 874-881 and WO 99/39809.

The oxidation catalyst can include at least one platinum group metal (or some combination of these), such as platinum, palladium or rhodium, coated on a flow-through monolith substrate. In one embodiment, the at least one platinum group metal is platinum, palladium or a combination of both platinum and palladium. The platinum group metal can be supported on a high surface area washcoat component such as alumina, a zeolite such as an aluminosilicate zeolite, silica, non-zeolite silica alumina, ceria, zirconia, titania or a mixed or composite oxide containing both ceria and zirconia.

In some aspects, a suitable filter substrate is located between the oxidation catalyst and the SCR catalyst. Filter substrates can be selected from any of those mentioned above, e.g. wall flow filters. Where the filter is catalyzed, e.g. with an oxidation catalyst of the kind discussed above, preferably the point of metering nitrogenous reductant is located between the filter and the SCR catalyst. Alternatively, if the filter is uncatalyzed, the means for metering nitrogenous reductant can be located between the oxidation catalyst and the filter. It will be appreciated that this arrangement is disclosed in WO 99/39809.

In some aspects, the catalyst composition for use in the present invention is coated on a filter located downstream of the oxidation catalyst. Where the filter includes the catalyst composition for use in the present invention, the point of metering the nitrogenous reductant is preferably located between the oxidation catalyst and the filter.

In some aspects, a system configuration includes a NOx adsorber catalyst followed by a selective catalytic reduction filter, which may include, for example, a vanadium SCR catalyst. In some aspects, a system configuration includes a first SCR followed by a second SCR. In some aspects, a system configuration includes a selective catalytic reduction filter followed by an SCR. In some aspects, a catalyst configuration includes an SCR followed by an ammonia oxidation catalyst. Where suitable, such catalysts may be included as different coatings on the same substrate. In some aspects, the SCR catalyst may include a vanadium SCR catalyst.

In some aspects, there is provided a vehicular lean-burn engine comprising an exhaust system according to the present invention.

In some aspects, the vehicular lean burn internal combustion engine can be a diesel engine, a lean-burn gasoline engine or an engine powered by liquid petroleum gas or natural gas.

Zoning and Configurations

In some aspects, a vanadium SCR catalyst may be combined with one or more additional catalyst compositions. Such combinations may involve zoned and/or layered configurations on one or multiple substrates.

In some aspects, a vanadium SCR catalyst may be combined with additional catalyst compositions formulated as SCR catalyst and/or oxidation catalysts such as ammonia oxidation catalysts. In some embodiments, a vanadium SCR catalyst may be combined with one or more additional SCR catalyst(s). In some embodiments, a vanadium SCR catalyst and the additional SCR catalyst(s) may be located on the same substrate. In some embodiments, a vanadium SCR catalyst and the additional SCR catalyst(s) may be located on different substrates. In some embodiments, a catalyst configuration may include a vanadium SCR catalyst with one or more additional SCR catalyst(s) on the same substrate and one or more additional SCR catalyst(s) on a separate substrate.

In some aspects, a vanadium SCR catalyst can be zoned in front of another SCR catalyst, such as a Cu-zeolite or Fe-Zeolite SCR catalyst. In some aspects, a vanadium SCR catalyst can be zoned in front of an ammonia slip catalyst (ASC), which ASC can be one or two layer. In some aspects, the ASC may be a one-layer catalyst, and may include oxidation function only, or mixed oxidation and SCR function (e.g. Pt on oxide support, plus Cu-Zeolite). In some aspects, the ASC may be a two-layer catalyst, and may include oxidation function in a bottom layer only or in both layers, and may have SCR function in only a top layer or in both layers. In some aspects, a vanadium SCR catalyst may overlap with the rear zone in each of the previous configurations. In some aspects, a vanadium SCR catalyst may be zoned in front of an ASC/DOC hybrid brick, i.e. an ASC also with higher DOC functionality (e.g. NO oxidation) such as through, for example, higher PGM loading.

Terms

In the present disclosure, the singular forms "a," "an," and "the" include the plural reference, and reference to a particular numerical value includes at least that particular value, unless the context clearly indicates otherwise. Thus, for example, a reference to "a material" is a reference to at least one of such materials and equivalents thereof known to those skilled in the art, and so forth.

When a value is expressed as an approximation by use of the descriptor "about," it will be understood that the particular value forms another embodiment. In general, use of the term "about" indicates approximations that can vary depending on the desired properties sought to be obtained by the disclosed subject matter and is to be interpreted in the specific context in which it is used, based on its function. The person skilled in the art will be able to interpret this as a matter of routine. In some cases, the number of significant figures used for a particular value may be one non-limiting method of determining the extent of the word "about." In other cases, the gradations used in a series of values may be used to determine the intended range available to the term "about" for each value. Where present, all ranges are inclusive and combinable. That is, references to values stated in ranges include every value within that range.

It is to be appreciated that certain features of the invention which are, for clarity, described herein in the context of separate embodiments, may also be provided in combination in a single embodiment. That is, unless obviously incompatible or specifically excluded, each individual embodiment is deemed to be combinable with any other embodiment(s) and such a combination is considered to be another embodiment. Conversely, various features of the invention that are, for brevity, described in the context of a single embodiment, may also be provided separately or in any sub-combination. Finally, while an embodiment may be described as part of a series of steps or part of a more general structure, each said step may also be considered an independent embodiment in itself, combinable with others.

The transitional terms "comprising," "consisting essentially of," and "consisting" are intended to connote their generally accepted meanings in the patent vernacular; that is, (i) "comprising," which is synonymous with "including," "containing," or "characterized by," is inclusive or open-ended and does not exclude additional, unrecited elements or method steps; (ii) "consisting of" excludes any element, step, or ingredient not specified in the claim; and (iii) "consisting essentially of" limits the scope of a claim to the specified materials or steps "and those that do not materially affect the basic and novel characteristic(s)" of the claimed invention. Embodiments described in terms of the phrase "comprising" (or its equivalents), also provide, as embodiments, those which are independently described in terms of "consisting of" and "consisting essentially" of. For those embodiments provided in terms of "consisting essentially of," the basic and novel characteristic(s) is the ability of the systems to combust fuels efficiently, without the need for separate igniters or heating the fuel mixtures above ignition temperatures prior to introducing them to the catalysts. Materials or steps which do not detract from such operability would be considered within the scope of such embodiments.

When a list is presented, unless stated otherwise, it is to be understood that each individual element of that list, and every combination of that list, is a separate embodiment. For example, a list of embodiments presented as "A, B, or C" is to be interpreted as including the embodiments, "A," "B," "C," "A or B," "A or C," "B or C," or "A, B, or C."

Throughout this specification, words are to be afforded their normal meaning, as would be understood by those skilled in the relevant art. However, so as to avoid misunderstanding, the meanings of certain terms will be specifically defined or clarified.

"Optional" or "optionally" means that the subsequently described circumstance may or may not occur, so that the description includes instances where the circumstance occurs and instances where it does not. Similarly, embodiments which refer to a component or step as being "optionally present," those embodiments include separate independent embodiments in which the step or component is present or absent. The description "optional" allows for, but does not require, the optional condition to occur.

EXAMPLES

Example 1: Catalyst Prepared with Vanadyl Oxalate and Iron Vanadate

A catalyst was prepared having the following formulation, which includes a weight ratio of V from vanadyl oxalate:V from $FeVO_4$ of 50:50:
Vanadyl oxalate at 55 $g/ft^3$ of elemental V
$FeVO_4$ at 55 $g/ft^3$ of elemental V
5 wt % $WO_3$/5 wt % $SiO_2/TiO_2$ at 3.21 $g/in^3$
Colloidal silica sol at 0.8 $g/in^3$
Xanthan gum 0.2-0.3 wt % of wet washcoat mass
Ammonium metatungstate at 150 $g/ft^3$ of elemental W
Ammonium hydroxide (for pH adjustment to 8-9)
Total calcined washcoat loading=4.28 $g/in^3$
Total Vanadium loading (expressed as $V_2O_5$ wt % of $V_2O_5+TiO_2$)=3.78 wt %
It is noted again that throughout this specification, the $TiO_2$ in this calculation refers to the content of $TiO_2$, rather than the loading of doped $TiO_2$, in the formulation.
Catalysts were also prepared having weight ratios of V from vanadium oxalate: V from $FeVO_4$ of 100:0 and 0:100.
100:0 Formulation:
Vanadium oxalate at 110 $g/ft^3$ of elemental V
5 wt % $WO_3$/5 wt % $SiO_2/TiO_2$ at 3.21 $g/in^3$
Colloidal silica sol at 0.8 $g/in^3$
Xanthan gum 0.2-0.3 wt % of wet washcoat mass
Ammonium metatungstate at 150 $g/ft^3$ of elemental W
Ammonium hydroxide (for pH adjustment to 8-9)
Total calcined washcoat loading=4.23 $g/in^3$
0:100 Formulation:
$FeVO_4$ at 110 $g/ft^3$ of elemental V
5 wt % $WO_3$/5 wt % $SiO_2/TiO_2$ at 3.21 $g/in^3$
Colloidal silica sol at 0.8 $g/in^3$
Xanthan gum 0.2-0.3 wt % of wet washcoat mass
Ammonium metatungstate at 150 $g/ft^3$ of elemental W
Ammonium hydroxide (for pH adjustment to 8-9)
Total calcined washcoat loading=4.33 $g/in^3$ Example 2: Stability to Aging The catalysts of Example 1, each with an elemental V loading of 110 $g/ft^3$, were then tested for NOx conversion at 225° C. and 500° C. at 500 ppm NO, ANR 1.05 at 60 k SV; the catalysts were tested fresh and after being aged at 580° C. for 100 hours. Results are shown in FIG. 1.

The results demonstrate that the catalysts prepared with a blend of vanadyl oxalate and iron vanadate provide an increased stability to aging at low temperatures.

Example 3: V Loading

The 50:50 catalyst from Example 1 was prepared, having a vanadium loading of 110 g/ft$^3$ with 3.78 wt % V$_2$O$_5$ of total V$_2$O$_5$+TiO$_2$, and a ratio of V from vanadyl oxalate:V from FeVO$_4$ of 50:50. Additional catalyst samples were prepared with increasing vanadium loading, but maintaining the 50:50 ratio. The catalysts were then tested for NOx conversion at 225° C. and 500° C. at 500 ppm NO, ANR 1.05, at 60 k SV. The catalysts were tested fresh and after aging at 580° C. for 100 hours.

Figure 2:
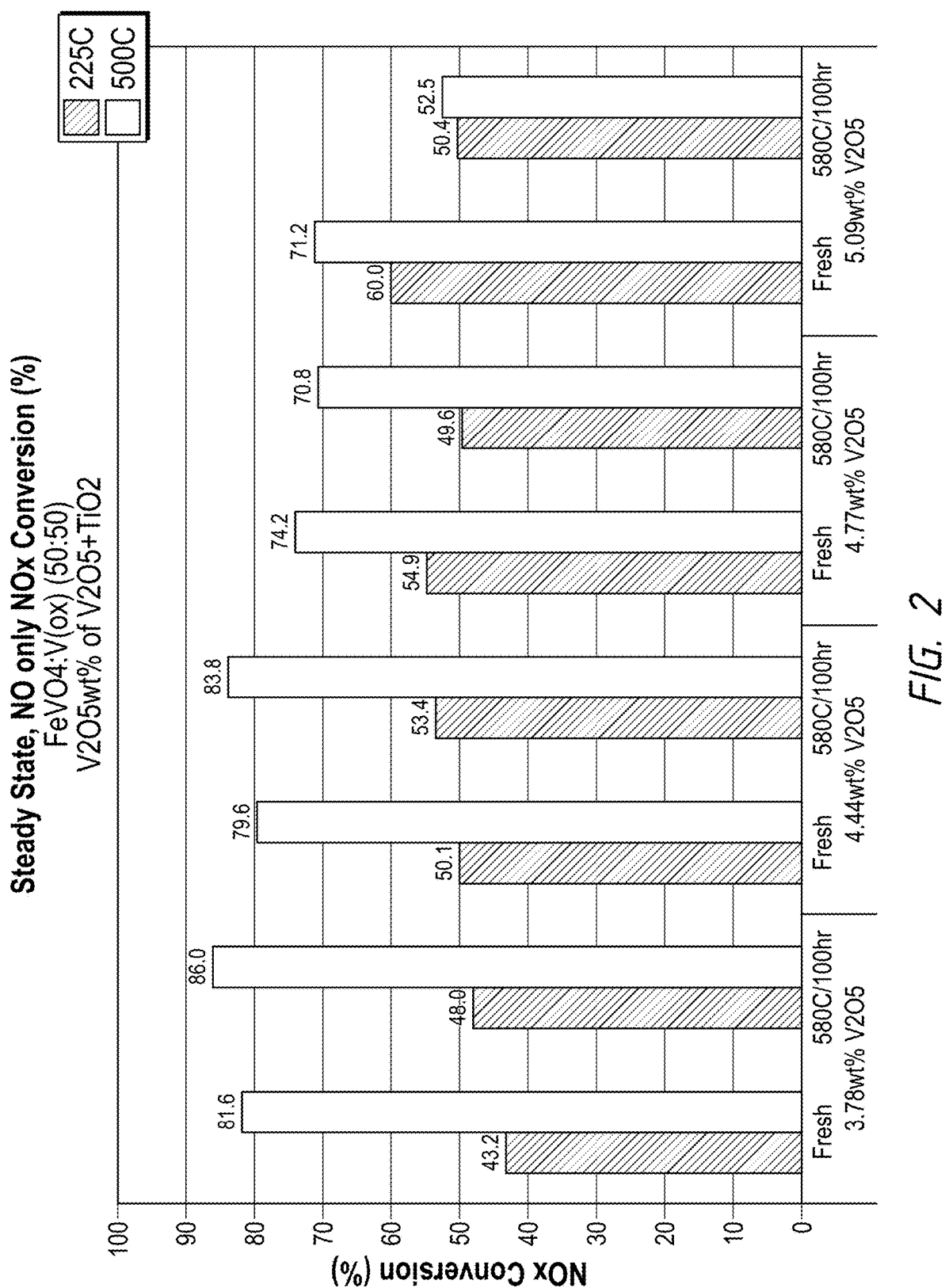

Results are shown in FIG. 2. By using a blend of iron vanadate and vanadium oxalate as per Example 1 (nominal 3.78 wt % V$_2$O$_5$ as % of V$_2$O$_5$+TiO$_2$)), it is possible to improve both fresh and aged performance through an increase in vanadium loading. This results in improved performance and good stability.

Example 4: Vox:FeVO$_4$

Samples were prepared according to the following:
Colloidal titania sol at 0.85 g/in$^3$
5 wt % WO$_3$/5 wt % SiO$_2$/TiO$_2$ at 3.65 g/in$^3$
Vanadium oxalate+FeVO$_4$ at total V loading and ratio described in Table 1
Ammonium metatungstate at 300 g/ft$^3$ of elemental W
Colloidal silica sol at 0.3 g/in$^3$
Urea 5 wt % of wet washcoat mass
Xanthan gum at 0.25 wt % of wet washcoat mass

TABLE 1

| Formulation | Elemental V from V$_2$O$_5$:Elemental V from FeVO$_4$ | Total V loading (V$_2$O$_5$ as % of V$_2$O$_5$ + TiO$_2$) |
| --- | --- | --- |
| 1 | 3:2 | 3.73 |
| 2 | 2:1 | 4.46 |

Formulations were coated onto cordierite substrates and tested fresh and after 580° C./100 h aging. Total calcined washcoat loading=5.3 g/in$^3$. Each were tested in the following conditions:
60K SV
NO 500 ppm
NH$_3$ 525 ppm
CO$_2$ 8%
O$_2$ 10%
CO 0.035%
H$_2$O 5%
N$_2$ balance The catalysts were then tested for NOx conversion at 225° C. and 500° C. at 500 ppm NO, ANR 1.05, at 60 k SV. The catalysts were tested fresh and after aging at 580° C. for 100 hours.

Figure 3:
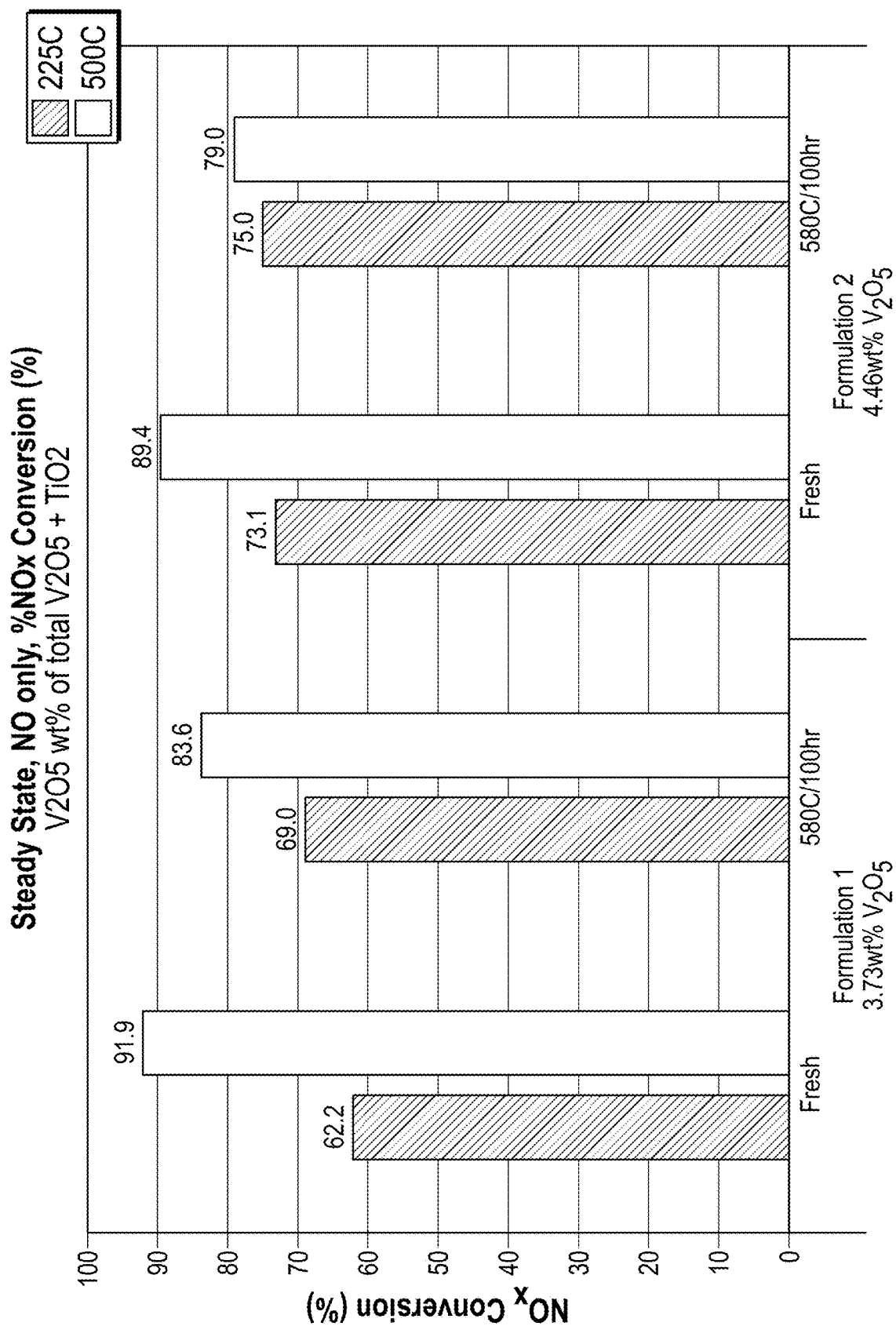
Figure 4:
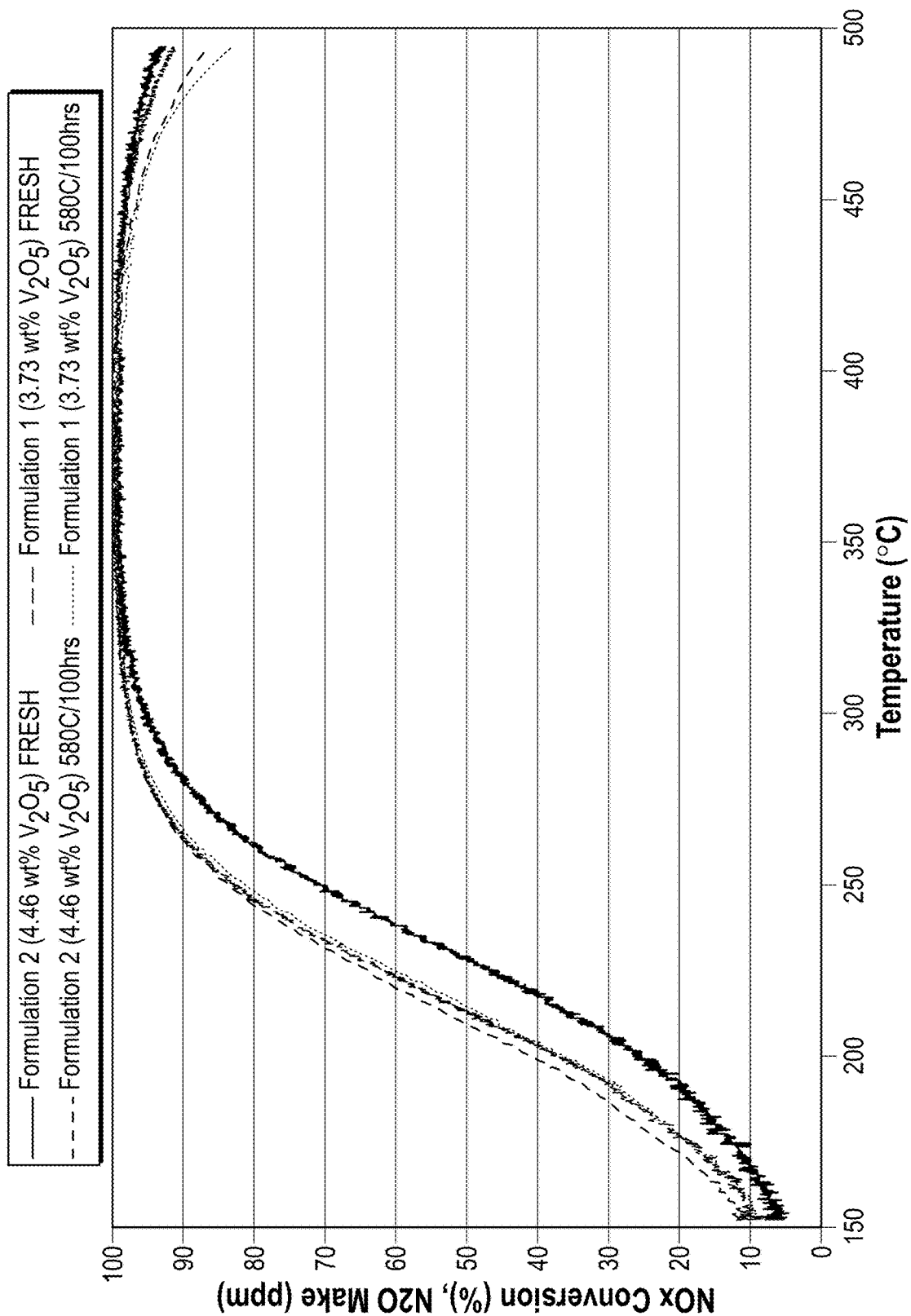

The results are shown in FIGS. 3 and 4. The catalyst with the 2:1 ratio (Formulation 2) has a higher total V loading and shows higher NOx conversions at low temperature, showing that blending vanadyl oxalate and iron vanadate enables higher total vanadium loadings to be achieved.

Example 5—FeVO$_4$ Inclusion

Catalysts were prepared according to the following formulations:
Colloidal titania sol at 0.85 g/in$^3$
5 wt % WO$_3$/5 wt % SiO$_2$/TiO$_2$ at 3.65 g/in$^3$
Vanadium oxalate+FeVO$_4$ at total V loading and ratio described in Table 2
Ammonium metatungstate at 300 g/ft$^3$ of elemental W
Colloidal silica sol at 0.3 g/in$^3$
Urea 5 wt % of wet washcoat mass
Xanthan gum at 0.25 wt % of wet washcoat mass

TABLE 2

| Formulation | Elemental V from V$_2$O$_5$:Elemental V from FeVO$_4$ | Total V loading (V$_2$O$_5$ as % of V$_2$O$_5$ + TiO$_2$) |
| --- | --- | --- |
| 2* | 2:1 | 4.46 |
| 3 | 1:0 | 4.46 |
| 4 | 0:1 | 4.46 |

*same formulation as Formulation 2 in Example 4

The catalysts were then tested for NOx conversion at 225° C. and 500° C. at 500 ppm NO, ANR 1.05, at 60 k SV. The catalysts were tested fresh and after aging at 580° C. for 100 hours.

Figure 5:
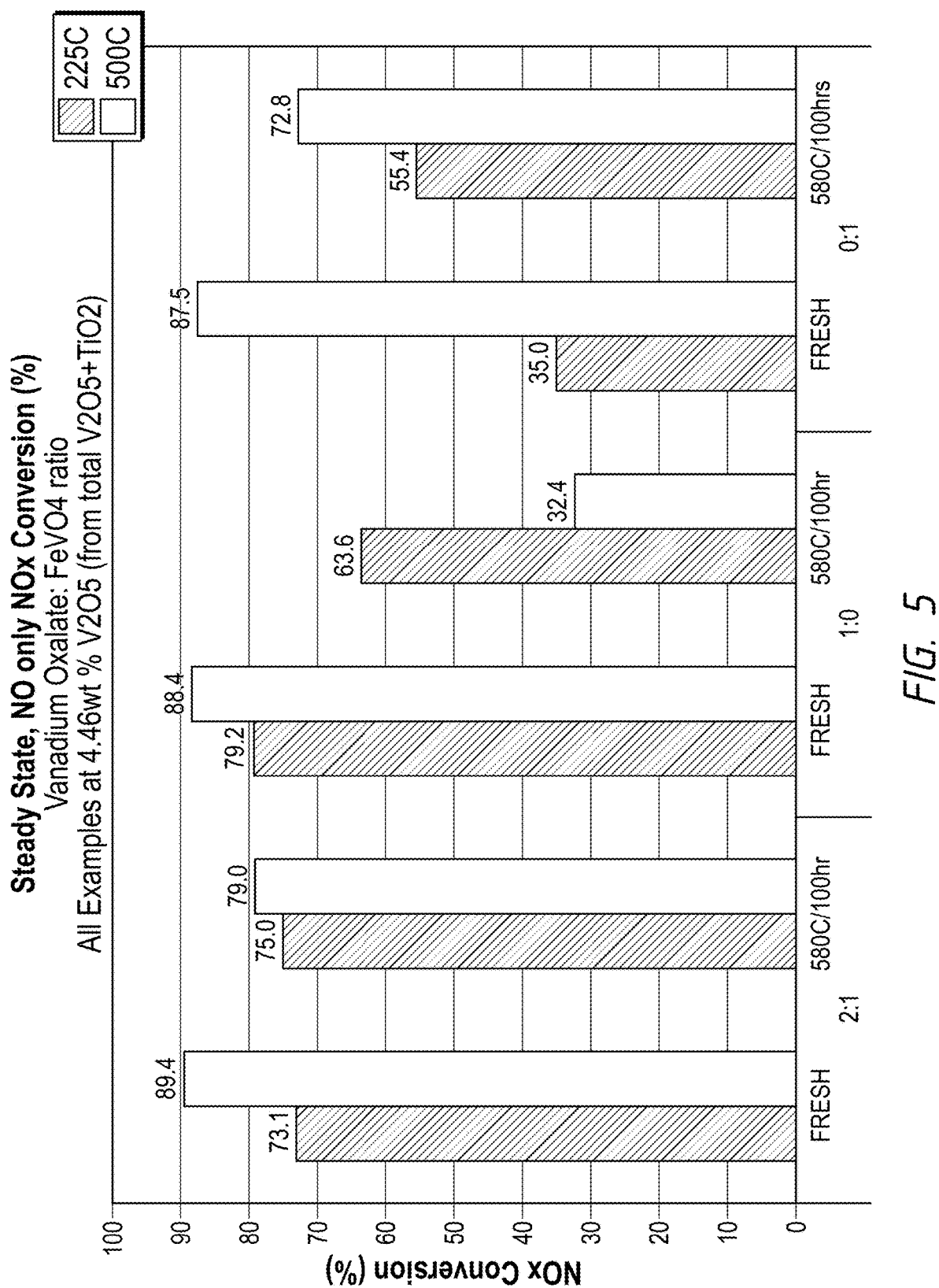

The results are shown in FIG. 5, and demonstrate that the catalysts prepared with a blend of vanadyl oxalate and iron vanadate provide an increased stability to aging at low temperatures. The catalyst including vanadium oxalate only (Formulation 3) shows severe deactivation.

Figures 6A, 6B, 6C, 6D:
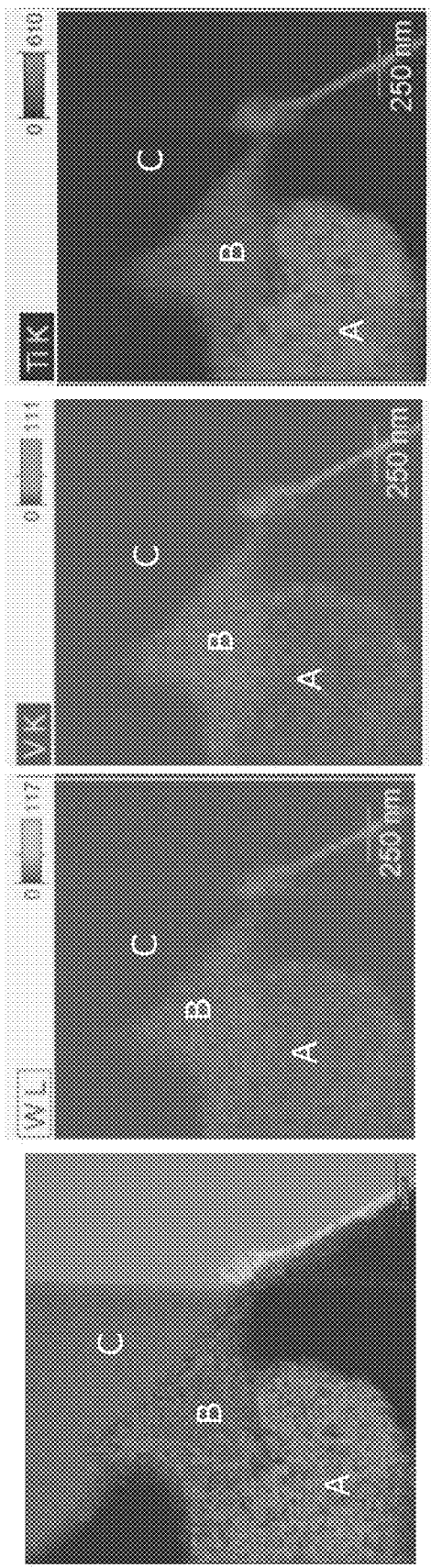

The washcoat-monolith interface in catalyst according to example 5 was analyzed by FIB/STEM/EELS technique, as shown in FIG. 6. Region A identifies TiO$_2$ from standard microsized titania, Region B identifies TiO$_2$ from colloidal titania, and Region C identifies the substrate. TiO$_2$ from standard microsized titania in region (A) and TiO$_2$ from colloidal titania in region (B) can clearly be discriminated in the Ti EDX, with TiO$_2$ from colloidal titania exhibiting behavior as a binder linking the standard microsize titania to the substrate. Vanadium and tungsten are seen in both regions A and B, demonstrating that the TiO$_2$ from colloidal titania acts as a support for active components. FIG. 6A is a TEM image, while FIGS. 6B, 6C, and 6D are EDX mapping.

Example 6—FeVO$_4$ Only, Vox Only, and Blends

Catalysts were prepared having vanadium from vanadyl oxalate only, having vanadium from FeVO$_4$ only, and having vanadium from a blend of vanadyl oxalate and FeVO$_4$. Such catalysts were prepared using only colloidal silica sol. Multiple catalysts of each type were prepared with varying total vanadium loadings (expressed as V$_2$O$_5$ wt % of total V$_2$O$_5$+TiO$_2$).

The catalysts include:
5 wt % WO$_3$/5 wt % SiO$_2$/TiO$_2$ at 3.21 g/in$^3$
Colloidal silica sol at 0.8 g/in$^3$
Xanthan gum 0.2-0.3 wt % of wet washcoat mass
Ammonium metatungstate at 150 g/ft$^3$ of elemental W
Ammonium hydroxide (for pH adjustment to 8-9)
With varying V source and loading, and thus total WCL.

Figure 7:
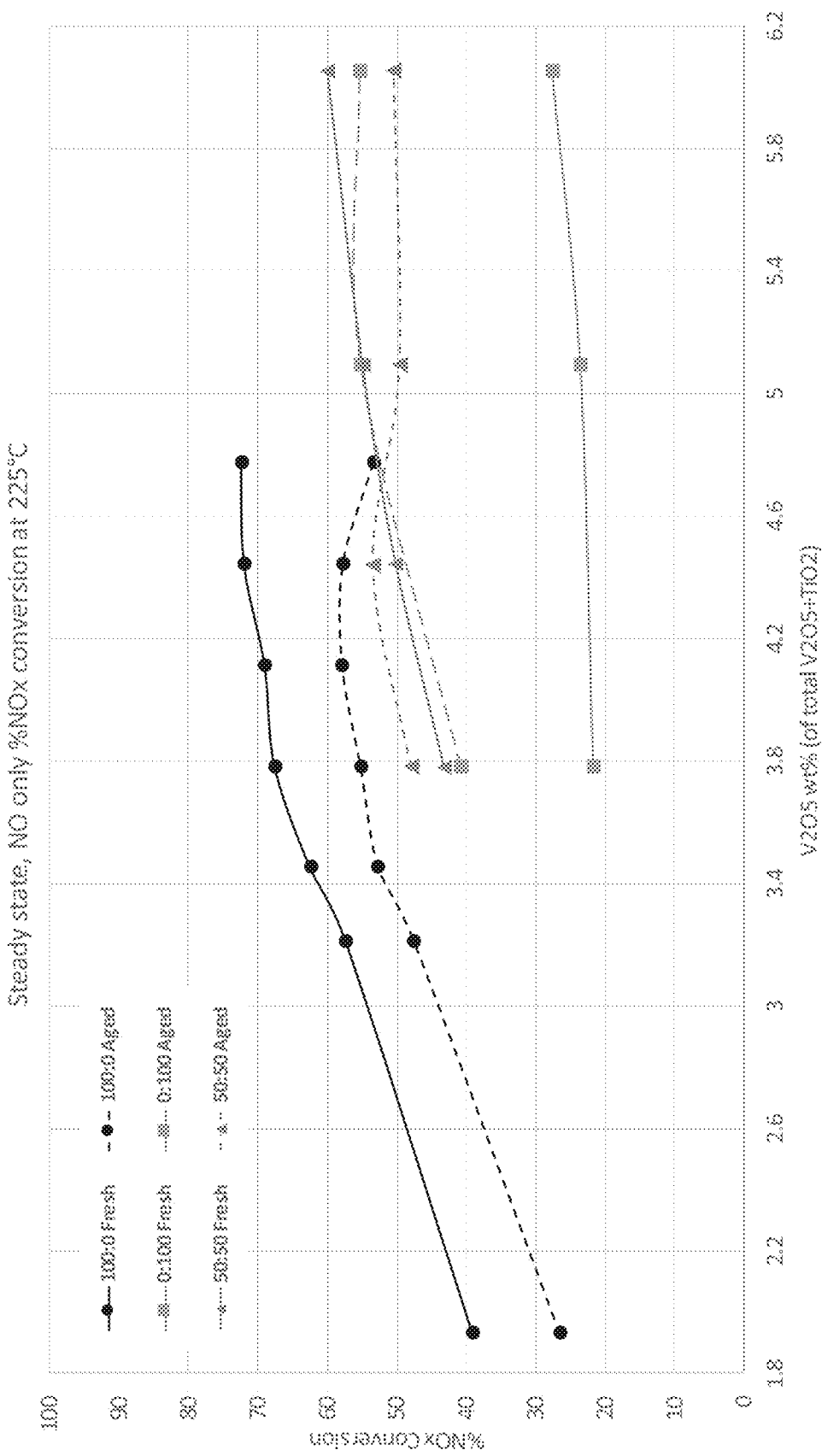

The catalysts were then tested for NOx conversion at 225° C. and 500° C. at 500 ppm NO, ANR 1.05, at 60 k SV. The catalysts were tested fresh and after aging at 580° C. for 100 hours. The results are shown in FIG. 7. The results show that for the vanadyl oxalate-only formulation, across all loadings evaluated, 1.93-4.77% $V_2O_5$ as % of $V_2O_5+TiO_2$, the fresh to aged delta is at least about 10% drop, and furthermore increases significantly at loadings above 4.11%. The $FeVO_4$-only formulations show high activation and fresh to aged delta. By blending the vanadyl oxalate and $FeVO_4$, a low fresh to aged delta is achieved by combining and optimizing the deactivation and activation behavior of vanadyl oxalate and $FeVO_4$. The fresh to aged delta for this blend of vanadium sources is lower than for the single source vanadium source cases for all datapoints (3.78-6.05% $V_2O_5$ as % of $V_2O_5+TiO_2$), and remains within the range of +1-10%. It is furthermore clear from the trends that further extrapolating to loadings down to about 2% $V_2O_5$ and lower as % of $V_2O_5+TiO_2$ would also offer the same benefits in reduced fresh to aged delta for the blend, and constitutes an embodiment of the invention.

Example 7: Titania Ratio

Catalyst samples were prepared according to the following:

Colloidal titania sol loading according to table
5 wt % $WO_3$/5 wt % $SiO_2/TiO_2$ loading according to table
Vanadium oxalate at 125 g/ft$^3$ of elemental V
$FeVO_4$ at 62 g/ft$^3$ of elemental V
Ammonium metatungstate at 300 g/ft$^3$ of elemental W
Colloidal silica sol at 0.3 g/in$^3$
Urea 5 wt % of wet washcoat mass
Xanthan gum at 0.25 wt % of wet washcoat mass

| Sample | $TiO_2$ from colloidal titania/g/in$^3$ | 5 wt % $WO_3$/5 wt % $SiO_2/TiO_2$ loading/ g/in$^3$ | $TiO_2$ from 5 wt % $WO_3$/5 wt % $SiO_2/TiO_2$/g/in$^3$ | Weight ratio of titania from colloid to standard micro sized titania (excluding dopants) |
|---|---|---|---|---|
| 5 | 0.2 | 4.2 | 3.78 | 0.053 |
| 6 | 0.4 | 4.0 | 3.6 | 0.111 |
| 7 | 0.6 | 3.8 | 3.42 | 0.175 |
| 8 | 0.8 | 3.6 | 3.24 | 0.247 |

Figure 8:
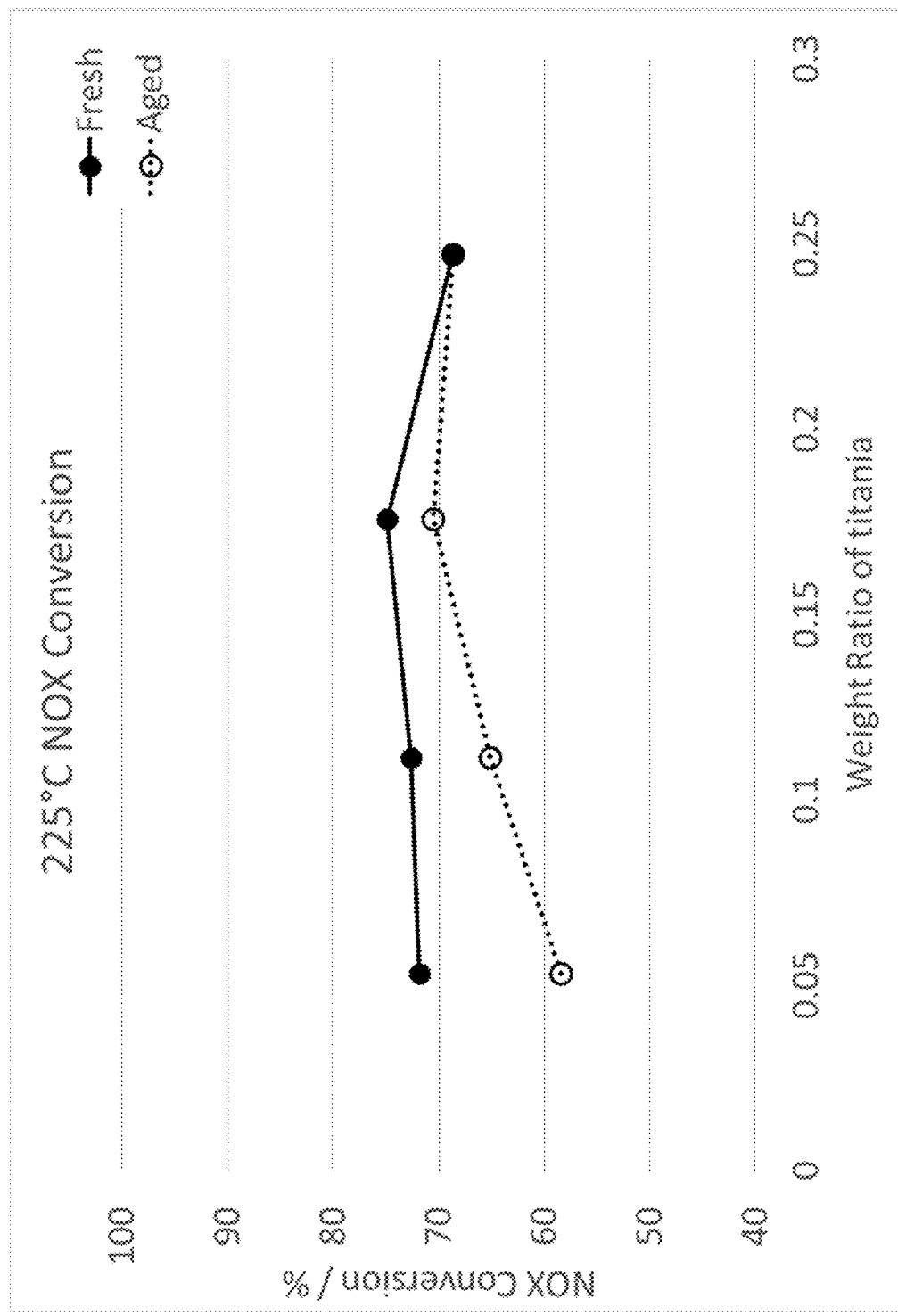

The catalysts were then tested for NOx conversion at 225° C. at 500 ppm NO, ANR 1.05, at 60 k SV. The catalysts were tested fresh and after aging at 580° C. for 100 hours. The results are shown in FIG. 8. The results show that using the colloidal titania blend gives a benefit in the titania weight ratio range of about 0.11 to about 0.25. A linear trend from 0.05-0.18 supports that the 10% fresh-aged delta is reached at a titania weight ratio of 0.08.

Example 8: $FeVO_4$ Inclusion in Antimony Promoted Catalyst

Catalyst samples were prepared according to the following:

Undoped $TiO_2$ at 3.8 g/in3
Vanadium oxalate loading according to table below
$FeVO_4$ loading according to table below
Antimony pentoxide at 460 g/ft$^3$ of elemental Sb
Colloidal silica sol at 1.0 g/in$^3$
Urea 5 wt % of wet washcoat mass
Xanthan gum at 0.25 wt % of wet washcoat mass

| Sample | V from Vanadium oxalate (expressed as $V_2O_5$ as % of $V_2O_5$ + $TiO_2$) | V from FeVO4 (expressed as $V_2O_5$ as % of $V_2O_5$ + $TiO_2$) |
|---|---|---|
| Sb-1 | 4.23 | 0.92 |
| Sb-2 | 5.17 | 0 |

Figure 9:
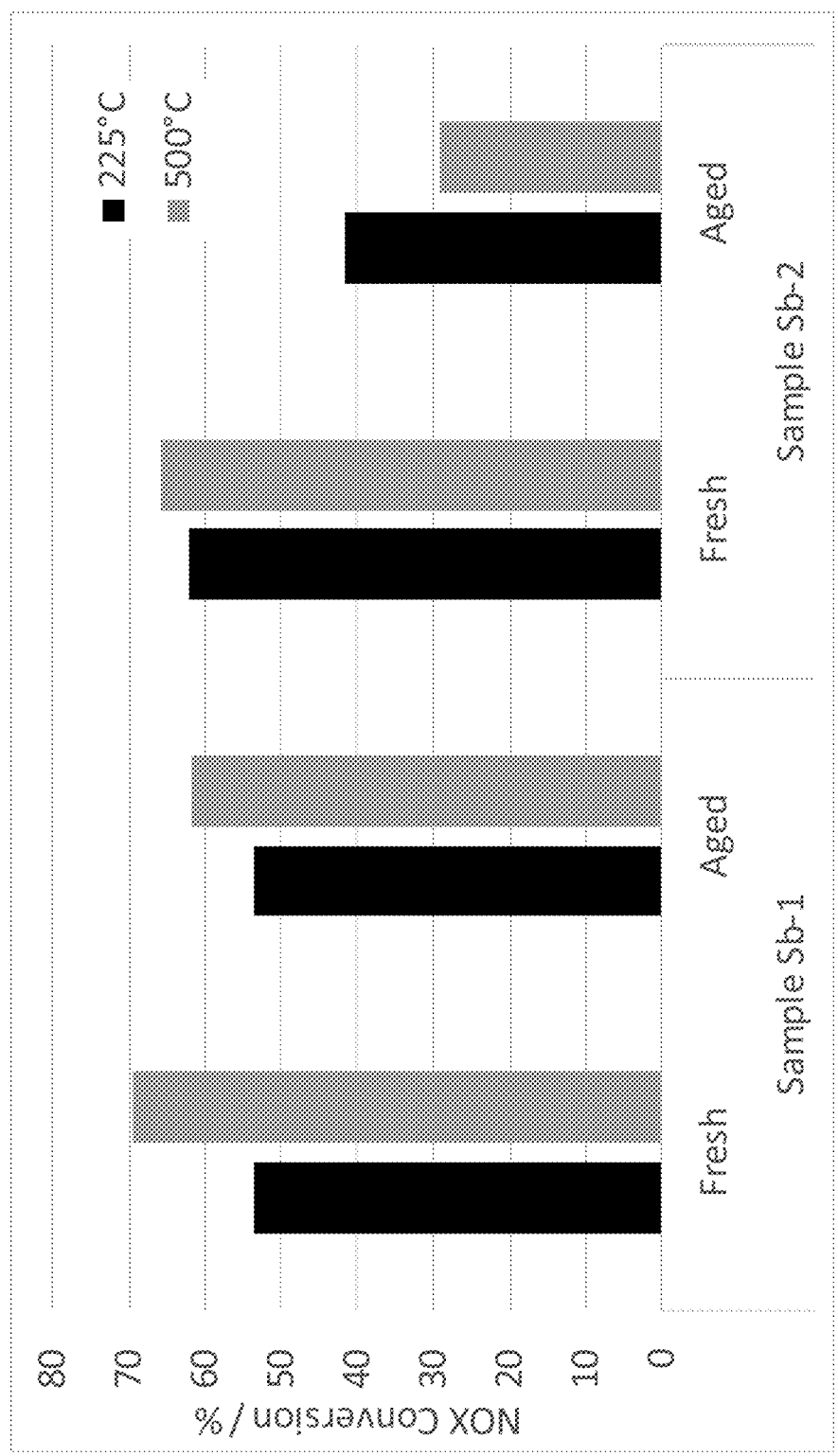

The catalysts were then tested for NOx conversion at 225° C. and 500° C. at 500 ppm NO, ANR 1.05, at 60 k SV. The catalysts were tested fresh and after aging at 580° C. for 100 hours. The results are shown in FIG. 9. The results show that replacing some of the vanadium oxalate with iron vanadate gives a clear benefit in aging durability and fresh to aged delta also for an antimony promoted system.

We claim:

1. A selective catalytic reduction catalyst comprising iron, vanadium, and titania, wherein the vanadium is present as (1) one or more vanadium oxides, and (2) metal vanadate of the form $Fe_xM_yVO_4$ where x=0.2 to 1 and y=1−x, and where M comprises one or more non-Fe metals when y>0;
   wherein the vanadium is present in an amount of about 3 wt % to about 7.5 wt %, expressed as $V_2O_5$ wt % of $V_2O_5+TiO_2$.

2. The selective catalytic reduction catalyst of claim 1, wherein the catalyst is prepared with a vanadium oxide precursor, and wherein the vanadium oxide precursor comprises vanadyl oxalate, ammonium metavanadate, vanadyl oxysulfate, vanadium pentoxide, vanadyl acetylacetonate, vanadium(III) acetylacetonate, or combinations thereof.

3. The selective catalytic reduction catalyst of claim 1, wherein M comprises Er, Al, Ce, or combinations thereof, when y>0.

4. The selective catalytic reduction catalyst of claim 1, wherein the metal vanadate comprises $FeVO_4$, $Fe_{0.5}Ce_{0.5}VO_4$, $Fe_{0.33}Al_{0.33}Er_{0.33}VO_4$, or combinations thereof.

5. The selective catalytic reduction catalyst of claim 1, wherein the vanadium is present on a support comprising titania.

6. The selective catalytic reduction catalyst of claim 5, wherein the titania is doped with W, Si, Mo, Nb, Sb, or combinations thereof.

7. The selective catalytic reduction catalyst of claim 1, wherein the vanadium is present in an amount of about 3.5 wt % to about 7 wt %, expressed as $V_2O_5$ wt % of $V_2O_5+TiO_2$.

8. The selective catalytic reduction catalyst of claim 1, wherein the vanadium oxide and metal vanadate are included in a weight ratio, expressed as a ratio of elemental vanadium, of about 6:1 to about 1:2.

9. The selective catalytic reduction catalyst of claim 1, comprising titania in an amount of about 60 wt % to about 93 wt % of the selective catalytic reduction catalyst.

10. The selective catalytic reduction catalyst of claim 9, wherein the titania comprises a blend of colloidal titania and a standard micro sized titania.

11. The selective catalytic reduction catalyst of claim 10, wherein the colloidal titania and standard micro sized titania are present in a weight ratio of about 0.08 to about 0.4.

12. The selective catalytic reduction catalyst of claim 1, wherein the catalyst further comprises tungsten, wherein the tungsten is included in addition to any tungsten doped on titania.

13. The selective catalytic reduction catalyst of claim 1, wherein the catalyst further comprises antimony, wherein antimony is included in addition to any antimony doped on titania.

14. The selective catalytic reduction catalyst of claim 1, wherein the catalyst comprises tungsten and antimony.

* * * * *